July 29, 1952 E. NYYSSONEN ET AL 2,605,047
LATITUDE - LONGITUDE COUNTER

Filed March 14, 1946 3 Sheets-Sheet 1

*INVENTORS*
EINARD NYYSSONEN
ARTHUR C. HUGHES, JR.
BY

ATTORNEY

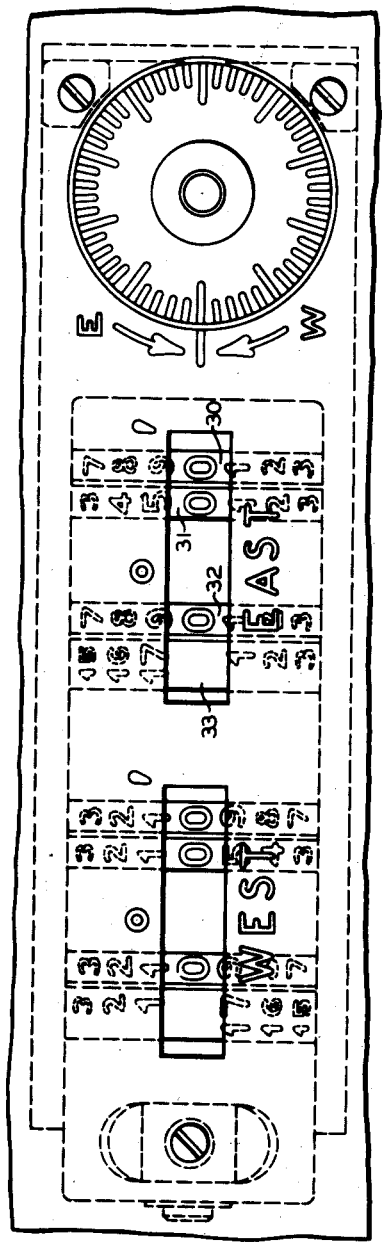
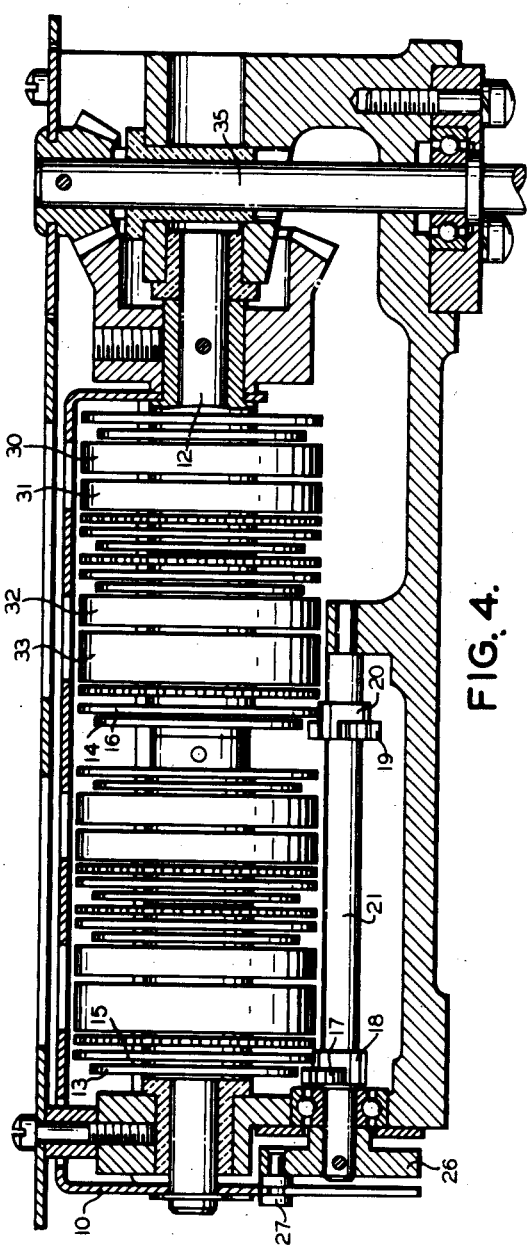
FIG. 3.
FIG. 4.
*INVENTORS*
EINARD NYYSSONEN
ARTHUR C. HUGHES, JR.
BY *M. A. Hayes*
ATTORNEY July 29, 1952  E. NYYSSONEN ET AL  2,605,047
LATITUDE - LONGITUDE COUNTER
Filed March 14, 1946  3 Sheets-Sheet 3
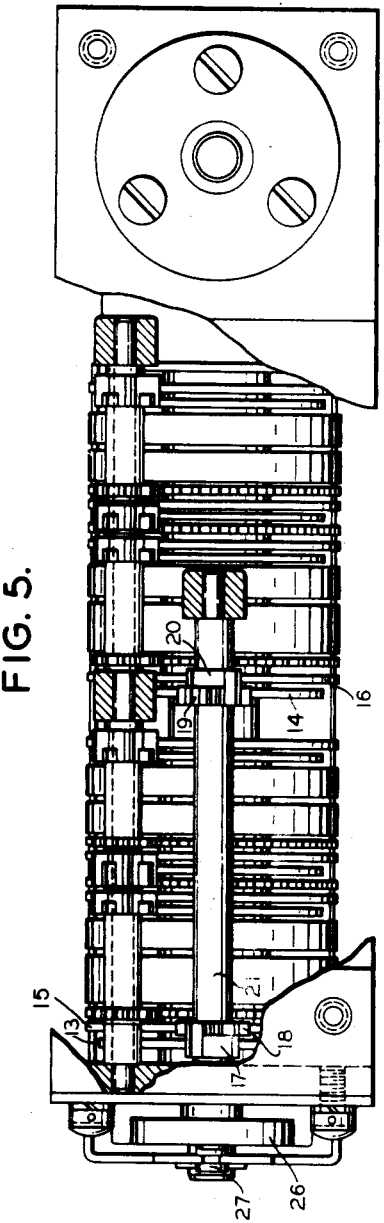
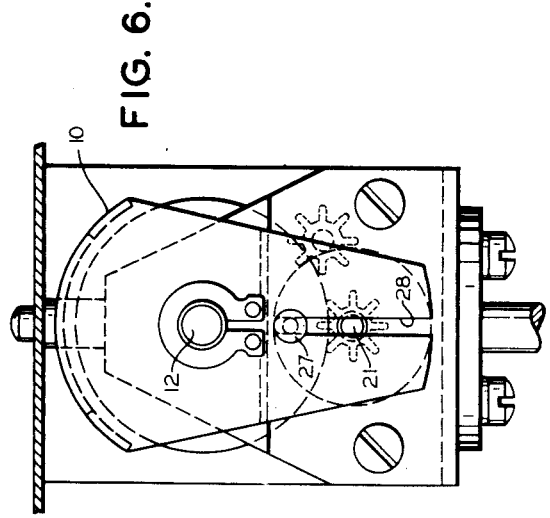
INVENTORS
EINARD NYYSSONEN
ARTHUR C. HUGHES, JR.
BY
*M. O. Hayes*
ATTORNEY Patented July 29, 1952

2,605,047

UNITED STATES PATENT OFFICE 2,605,047

LATITUDE-LONGITUDE COUNTER

Einard Nyyssonen, Watertown, Mass., and Arthur C. Hughes, Jr., Puente, Calif., assignors, by mesne assignments, to the United States of America as represented by the Secretary of the Navy Application March 14, 1946, Serial No. 654,495

5 Claims. (Cl. 235—1)

This invention relates to automatic counting mechanisms, and more particularly to latitude-longitude counters featuring a novel automatic screening shutter to prevent gross errors in reading.

The prior art has included cumulative counting mechanisms (though none adapted to latitude-longitude counting). In such counting mechanisms, however, a difficulty has existed because of the necessity of counting in either direction from a zero reference point. This requires two counters of opposite hand on a single counting shaft. As one counter reads increasing from zero the other runs backward from zero, thus giving a reading completely meaningless. This invention incorporates a shutter which conceals the meaningless reading at all times.

A general object of this invention is to provide an automatic counting mechanism for compiling and presenting data on the changing latitude or longitude of the unit upon which said counting mechanism is mounted.

Another object of this invention is to provide an automatic counting mechanism having means disposed therein for eliminating the ambiguity of presentation heretofore disadvantageous in the art.

A further object of this invention is to provide an automatic counting mechanism comprising a shutter, said shutter acting to screen at all times whichever of the two readings on the counter is meaningless.

Still another object of this invention is to provide a longitude or latitude counter, said counter comprising a shutter which will screen the west (or south) reading when the true reading is east (or north), and vice versa.

Further objects and advantages of this invention will be apparent from the following description and claims, taken in connection with the accompanying drawings, in which:

Figs. 3, 4, 5, and 6 are detailed assembly views of the entire counting mechanism, including shutter.

Figure 1:
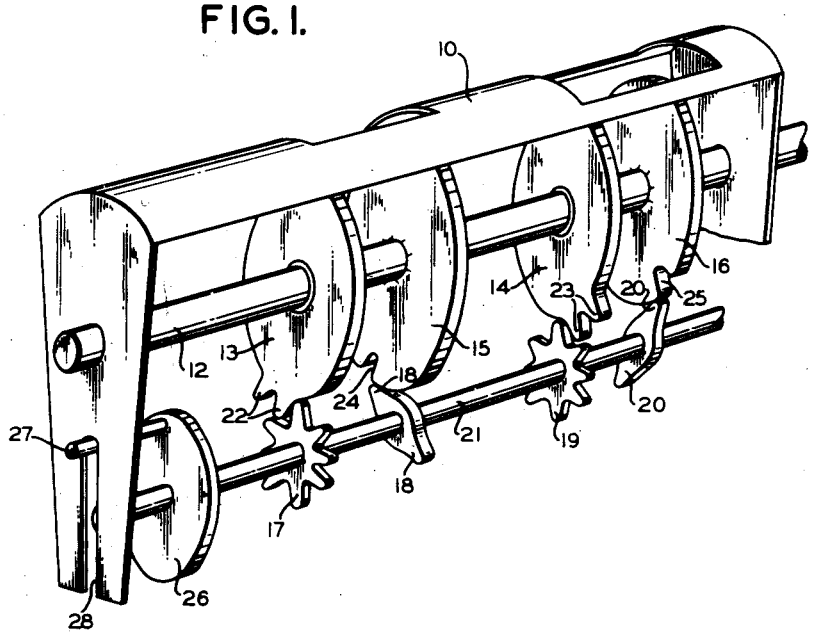
Fig. 1 is a perspective view of a simplified device illustrating, in principle only, the shutter-operating mechanism of this invention.

Referring to Fig. 1 there is shown a schematic representation of the shutter-operating mechanism of this invention. It should be emphasized that Fig. 1 is schematic only, and is presented to illustrate principle. In detail it differs from the shutter-operating mechanism as actually constructed. In Fig. 1 there is shown a shutter 10, pivotally mounted on a rotatable driven shaft 12. Shaft 12 drives two transfer step-tooth gears 13 and 14, and two locking gears 15 and 16. These four gears are driven from shaft 12 in the same direction of rotation as shaft 12 itself travels, but they advance only intermittently as the shaft rotates steadily. The gearing between shaft 12 and gears 13, 14, 15, and 16 is not shown in Fig. 1, but appears in Figs. 4 and 5. Gears 13 and 15 of Fig. 1 correspond to gears of the "west" motion in the actual device, and gears 14 and 16 represent gears of the "east" motion. (See Figs. 3, 4, and 5). Gears 17 and 18, fixedly secured to a camshaft 21, represent transfer pinion and locking teeth, respectively, for the "west" counter. Gears 19 and 20 perform similarly for the "east" counter. Transfer step-tooth gears 13 and 14 are provided with pairs of teeth 22 and 23, respectively, for imparting motion to pinions 17 and 19. Locking gears 15 and 16 have mating tooth spaces 24 and 25, respectively, to receive locking teeth 18 and 20. A cam 26, fixedly mounted on camshaft 21, is provided with a pin 27. Pin 27 engages a slot 28 in shutter 10, thereby imparting rotation about shaft 12 to shutter 10, in response to rotation of camshaft 21.

Figure 2:
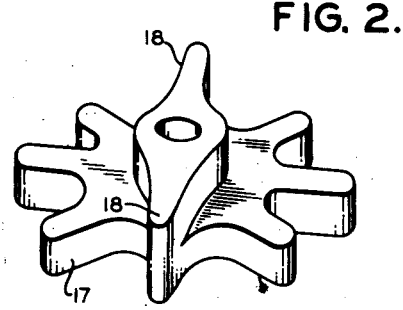
Fig. 2 is a perspective view of a modified, non-standard, transfer pinion as used in the shutter-operating mechanism of this invention.

Referring to Fig. 2, there is shown a preferred form of construction of one of the two similar transfer pinions 17 and 19 having one of the two similar locking teeth 18 and 20 formed integral therewith. These transfer pinions differ from a standard transfer locking pinion in that only two locking teeth are present on each pinion. A standard eight-tooth locking pinion has four locking teeth, made by eliminating alternate teeth from part of the gear thickness. The two non-standard transfer locking pinions of this shutter-operating mechanism are fixedly so mounted on camshaft 21 as to have the axes of locking teeth mutually perpendicular.

With the counter at zero reading, the relative position of transfer step-tooth gears, locking gears and transfer locking pinions is as shown in Fig. 1. Note that pairs of transfer gear teeth 22 and 23 straddle camshaft 21, and that camshaft 21 is locked in position by locking teeth 18 and 20 bearing respectively on the peripheries of locking gears 15 and 16. With camshaft 21 in this position, pin 27 is at its uppermost position, and therefore shutter 10 is held in the neutral (zero) position. (In the actual device both zero readings are then visible, neither covered by the shutter.) Assume then that shaft 12 is turned clockwise as seen from the driven (right-hand, in Fig. 1) end. This clockwise motion is associated with eastward travel. Teeth of gears 14 and 16 move away from their opposing teeth and have no effect. Teeth of gears 13 and 15, however, mesh with 17 and 18 thereby causing a two-tooth (=¼-revolution) advance of gear 17. This motion is imparted to pin 27 as a 90-degree rotation about camshaft 21, which rotation is enough to move the shutter from its zero position to one which screens the ("west") opening associated with gears 13 and 15 but leaves revealed the ("east") opening associated with gears 14 and 16. With continued eastward travel camshaft 21 will be locked in the above-defined position until, at 180° longitude, teeth 23 and 25 impart another ¼-revolution to camshaft 21 through gears 19 and 20. The resulting effect is to return the shutter to its original (zero) position. It should be noted that the shutter is locked in position by locking teeth 18 and 20, and the shutter can move only when tooth 18 or 20 engages mating tooth space 24 or 25 of locking gear 15 or 16.

The preceding description of operation deals only with the gears which finally move the shutter. The mechanism constitutes only a part of this invention, the remaining essential features of which may be described as follows.

Referring to Fig. 3, a top exterior view of the counter, there is shown the numbering system on the four wheels from which longitude is read. (The four wheels for "east" longitude will be considered, it being kept in mind that the four for "west" longitude are numbered similarly but of opposite hand.) Wheel 30 is keyed to shaft 12 which rotates once to two turns of an input shaft 35. As input shaft 35 turns one revolution per 0°—10' of longitude, wheel 30 turns one revolution per 0°—20' of longitude. Wheel 30 is graduated in single minutes with the numbers running from 0 to 9 twice on the circumference. In the following discussion the term "transfer" is taken to signify means whereby one wheel after rotating a predetermined amount causes a second wheel to advance one rotational step of predetermined size. Wheel 30 has two transfers to advance wheel 31, graduated in tens of minutes, with the values running from 0 to 50 thrice. Wheel 31 has three transfers to advance wheel 32, graduated in single degrees with the figures running from 0 to 9 twice, as on wheel 30. Wheel 32 has two transfers to advance a tens-of-degrees wheel 33, graduated from 0 to 18, representing 0 to 180°, once in its circumference. Wheel 33 has one transfer to effect the shutter operation already described. All transfers up to but not including the actuating of camshaft 21 are accomplished with standard eight-tooth transfer locking pinions, heretofore described in connection with Fig. 2. As heretofore stated, actuating of camshaft 21 is accomplished through non-standard transfer locking pinions each having only two locking teeth.

Referring to Fig. 4, there is shown a sectional elevation of the assembly. This figure, with Figs. 5 and 6, shows the actual layout and position of camshaft 21, shown only schematically in Fig. 1. Figs. 5 and 6 show also the arrangement of the standard transfer pinions.

Consider a transfer operation commencing from longitude zero, at which point a zero reading is visible on both "east" and "west" scales. Assume travel is eastward. When the "west" counter turns (backward) to 179°—59', the associated transfer gear will rotate 20 degrees (on the tens-of-degrees wheel, one-eighteenth of one revolution). Because of the initial position of transfer step-tooth gear 13, the first half of this 20-degree rotation merely brings the first of the pair of transfer teeth 22 to bear on transfer pinion 17. The remaining 10-degree rotation will advance transfer pinion 17 by one tooth. With eight teeth in the pinion, this will necessarily rotate the camshaft 45 degrees, enough to close the shutter over the aperture for "west" readings. Fig. 1 is helpful in understanding this action.

With continued eastward travel the "west" transfer gear advances again when the "west" reading (already hidden by the shutter) drops from 170° to 169°—59'. At this time transfer gear 13 turns another twenty degrees. Of this, the first ten degrees rotates the camshaft 45 degrees and the final ten degrees moves the transfer step teeth 22 away from the pinion, thus providing working clearance. It will be observed that this second 45 degree rotation of camshaft 21 moves shutter 10 only a small and unessential amount.

With subsequent travel from east to west the driven shaft 12 would revolve in the reverse direction (counterclockwise as seen from the driven end). As longitude changed from east to west, shutter 10 would screen the "east" reading and reveal the "west."

A longitude counter has been described. A latitude counter would differ in that readings would be north and south rather than east and west. Also, wheels reading tens of degrees would be graduated from 0 to 9 (0) twice in their periphery, rather than from 0 to 18 (0) once.

What is claimed is:

1. An indicating mechanism comprising a plurality of numeral wheels each bearing a set of numerals and arranged in two groups of wheels, the numerals on the wheels of one group progressively increasing in an opposite direction to the numerals of the other group, an actuating shaft, an intermediate transfer drive connection between said wheels, a shutter pivotally mounted on said shaft for selectively screening one or the other of said groups of wheels, a second shaft mounted in parallel relationship with said first shaft, a geared connection between said transfer drive and said second shaft to rotate said second shaft a predetermined amount, a disc crank connection between said second shaft and said shutter to position said shutter, and locked gearing to prevent rotation of said shutter other than by said transfer drive.

2. An indicating mechanism comprising an actuating shaft, a plurality of numeral wheels mounted in axial alignment on said shaft each bearing thereon a set of numerals and arranged in two groups of wheels, the numerals on the wheels of one group progressively increasing in an opposite direction to the numerals of the other group for the same direction of rotation of said wheels, an intermediate transfer drive connection between said wheels in each group, a shutter pivotally mounted on said shaft, a second shaft mounted in parallel relationship with said first shaft, a gear connection between said transfer drive and said second shaft to rotate said second shaft a predetermined amount, a disc crank connection between said second shaft and said shutter to rotate said shutter a predetermined amount about said first shaft upon rotation of said second shaft thereby selectively screening one or the other of said groups of numeral wheels, and locked gearing to prevent rotation of said second shaft other than by said transfer drive.

3. An indicating mechanism comprising, a plurality of counter wheels each bearing a set of indicia and arranged in two groups of wheels, the indicia on the wheels of one group progressively increasing in an opposite sense to the indicia of the other group, a normally locked shutter for screening one or the other of said groups, and means operable in response to the rotation of said wheels for automatically unlocking said shutter, causing said shutter to shift its screening position and relocking said shutter.

4. An indicating mechanism comprising, a shaft, a plurality of numeral wheels each bearing a set of numerals and mounted on said shaft in two groups, the numerals on the wheels of one group progressively increasing in an opposite direction to the numerals of the other group, means for periodically causing rotation of said wheels in response to rotation of said shaft, a shutter pivotally mounted on said shaft, a second shaft mechanically coupled to said shutter, means mounted on said second shaft for locking said shutter in a predetermined position to screen one or the other of said groups, and means responsive to rotation of said wheels for automatically unlocking said second shaft, rotating said shutter a predetermined amount with respect to said first-mentioned shaft and relocking said second shaft.

5. An indicating mechanism comprising, a rotatable shaft, a plurality of numeral wheels each bearing a set of numerals and mounted on said shaft in two groups, the numerals of the wheels of one group progressively increasing in an opposite direction to the numerals of the other group, means operable in response to rotation of said shaft for periodically rotating said wheels a predetermined amount, a shutter pivotally mounted on said shaft, a second shaft disposed in parallel relationship with respect to said first shaft, locking means for preventing rotation of said second shaft, means for rotating said shutter a predetermined amount about said first shaft in response to rotation of said second shaft to screen one or the other of said groups, and means for unlocking said second shaft causing said second shaft to move said shutter from one screening position to the other and relocking said second shaft in response to periodic rotation of said numeral wheels.

EINARD NYYSSONEN.
ARTHUR C. HUGHES, Jr.

REFERENCES CITED

The following references are of record in the file of this patent:

UNITED STATES PATENTS

| Number | Name | Date |
| --- | --- | --- |
| 1,542,465 | Macgill | June 16, 1925 |
| 2,260,541 | Schivenn | Oct. 28, 1941 |
| 2,310,347 | Berck | Feb. 9, 1943 |

FOREIGN PATENTS

| Number | Country | Date |
| --- | --- | --- |
| 29,422 | Great Britain | 1904 |